Jan. 12, 1954

W. JAMESON 2,665,918

RECORD STORAGE AND PLAYER APPARATUS

Filed July 26, 1946

8 Sheets-Sheet 1

Inventor:
William Jameson,
By Dawson, Booth and Spangenberg,
Attorneys.

Jan. 12, 1954 W. JAMESON 2,665,918

RECORD STORAGE AND PLAYER APPARATUS

Filed July 26, 1946 8 Sheets-Sheet 2

Inventor:
William Jameson,

By Dawson, Booth and Spangenberg,
Attorneys.

Jan. 12, 1954 W. JAMESON 2,665,918

RECORD STORAGE AND PLAYER APPARATUS

Filed July 26, 1946 8 Sheets-Sheet 3

Inventor:
William Jameson,
By Dawson, Booth and Spangenberg,
Attorneys.

Jan. 12, 1954 W. JAMESON 2,665,918

RECORD STORAGE AND PLAYER APPARATUS

Filed July 26, 1946 8 Sheets-Sheet 4

Inventor:
William Jameson,
By Dawson, Booth and Spangenberg,
Attorneys.

Jan. 12, 1954 W. JAMESON 2,665,918

RECORD STORAGE AND PLAYER APPARATUS

Filed July 26, 1946 8 Sheets-Sheet 5

Inventor:
William Jameson,
By Dawson, Booth and Spangenberg,
Attorneys

Inventor:
William Jameson,
By Dawson, Booth and Spangenberg,
Attorneys.

Jan. 12, 1954 W. JAMESON 2,665,918

RECORD STORAGE AND PLAYER APPARATUS

Filed July 26, 1946 8 Sheets-Sheet 7

Inventor:
William Jameson,

By Dawson, Brothers & Sprangenberg,
Attorneys.

Inventor:
William Jameson,
By Dawson, Booth & Spangenberg,
Attorneys.

Patented Jan. 12, 1954 2,665,918

UNITED STATES PATENT OFFICE 2,665,918

RECORD STORAGE AND PLAYER APPARATUS

William Jameson, Chicago, Ill.

Application July 26, 1946, Serial No. 686,351

6 Claims. (Cl. 274—10)

This invention relates to record storage and player apparatus, and more particularly to a combination record storage unit and player.

An object of the invention is to provide a compact structure in which records of varying diameters may be stored in a single storage magazine and played as selected through automatic mechanism without the necessity of the records being handled. A further object is to provide improved apparatus of simple and compact structure, employing a minimum of parts for automatically operating mechanically and in a desired sequence records supported in a storage magazine. Another object is to provide remote control for the selection and playing of records. Yet another object is to provide mechanism for mechanically playing in sequence records carried in a storage magazine, the records being supported free of any central shaft extending through the records and the records, if desired, being imperforate. A further object is to provide mechanism for the playing of records carried in a storage magazine, with proper selection of either or both sides of any or all records, while at the same time providing means for rejecting or cancelling any unplayed portion of the records. A further object is to provide an automatic record-playing device of the character already referred to in which records may be easily inserted or withdrawn from the storage magazine at any time. A further object is to provide apparatus which will be effective for playing only when a selected record is in place in its cradle. A further object is to provide improved control mechanism for restoring the parts to initial position after the playing of a record, etc. Other specific objects and advantages will appear as the specification proceeds.

The invention is illustrated, in a preferred embodiment, by the accompanying drawings, in which—

Figures 1, 2:
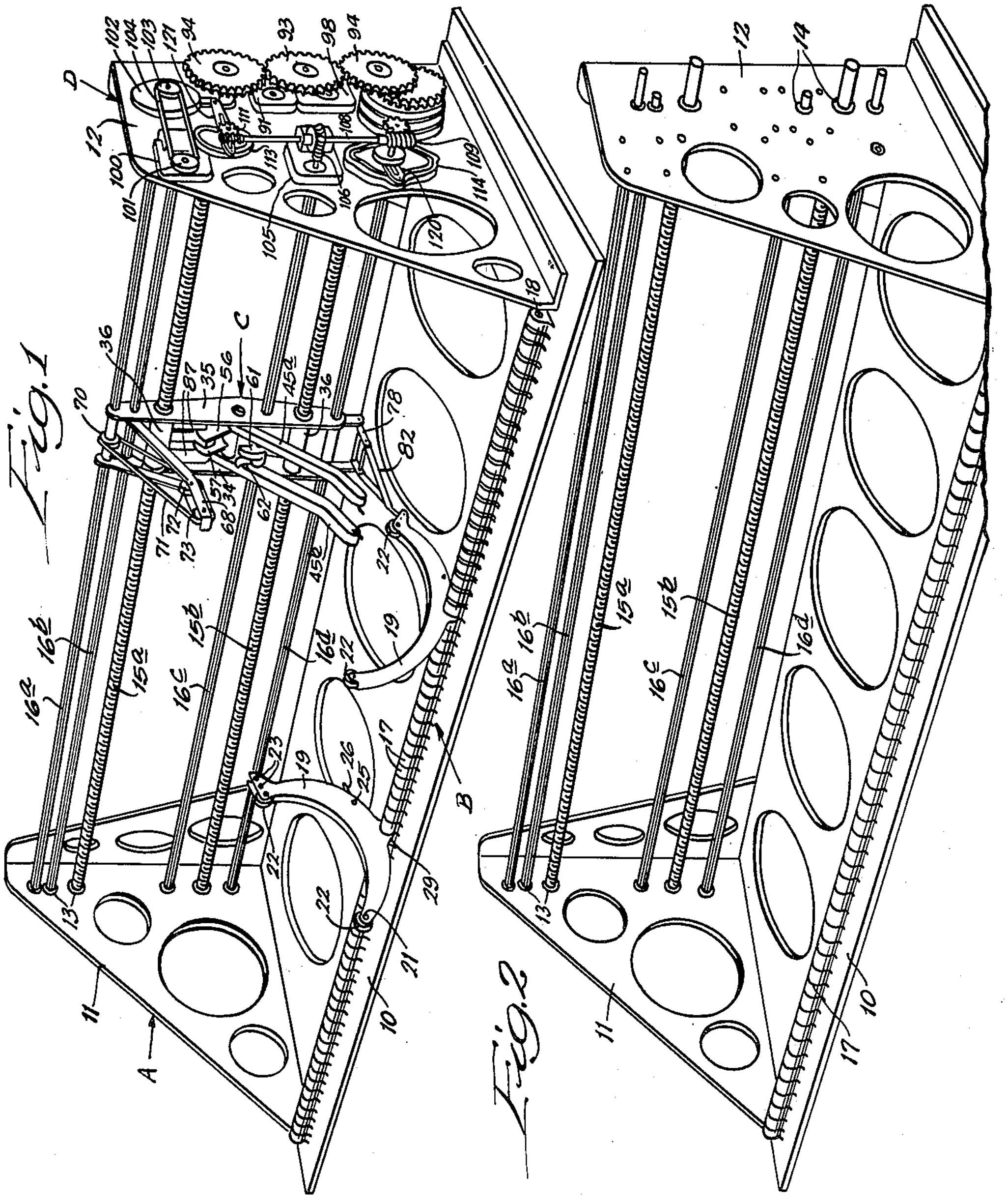
Figure 3:
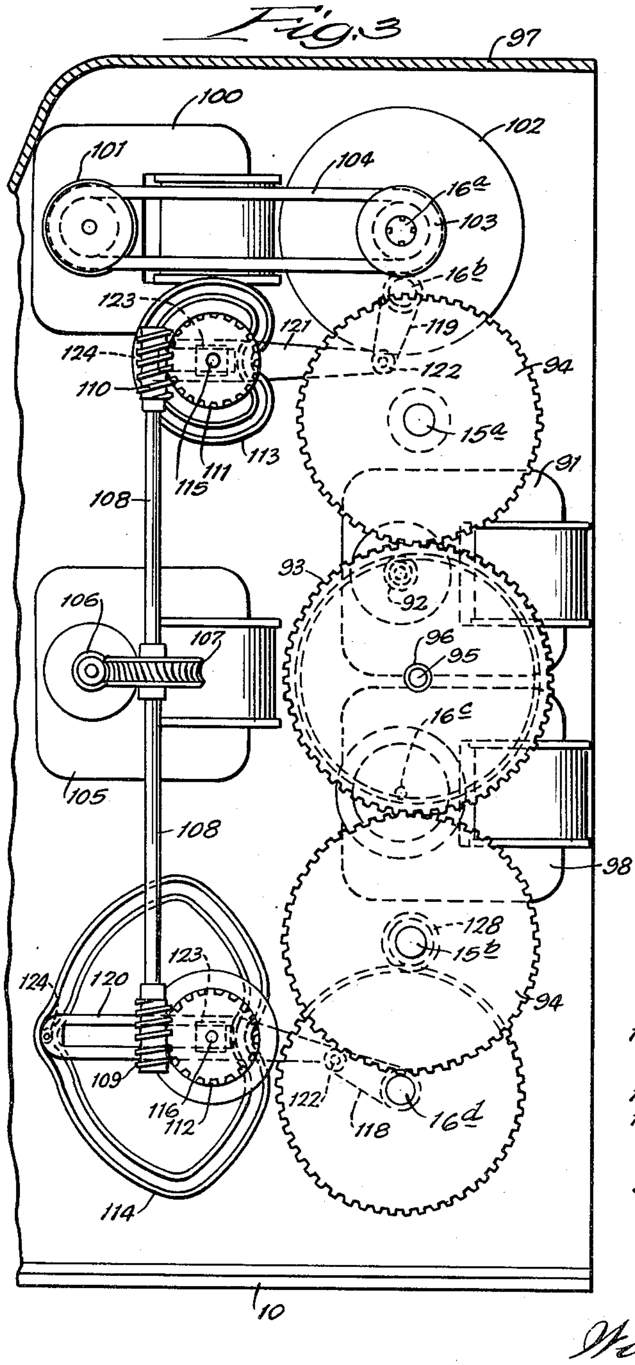
Figure 4:
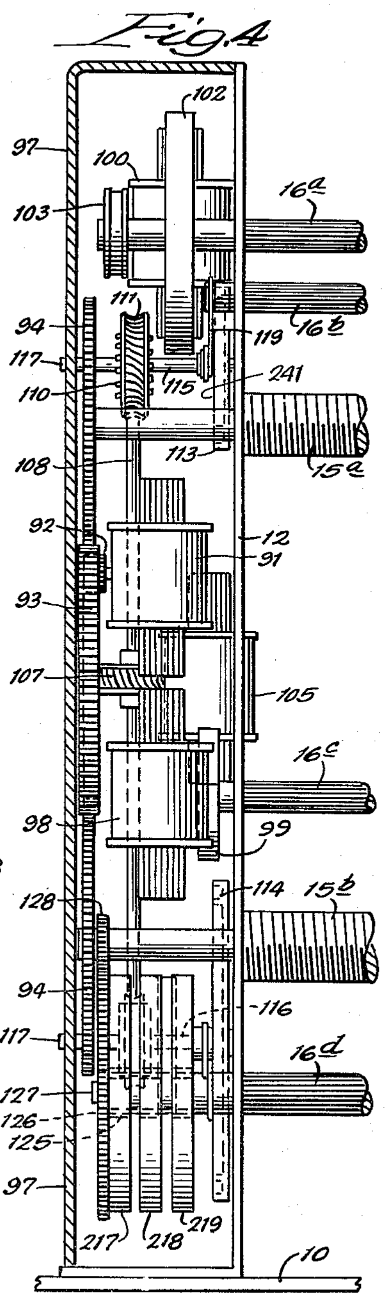
Figure 5:
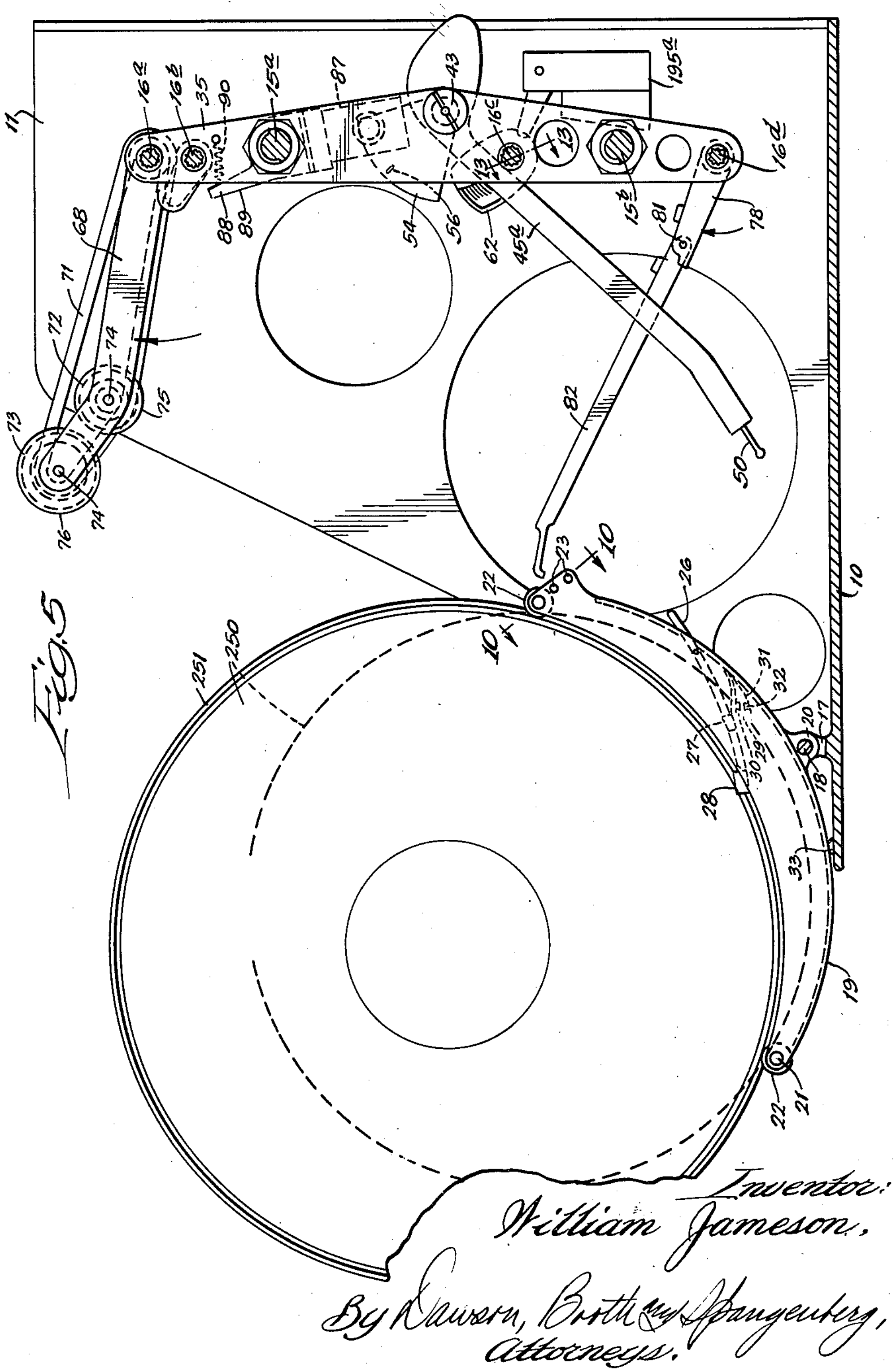
Figures 6, 6A:
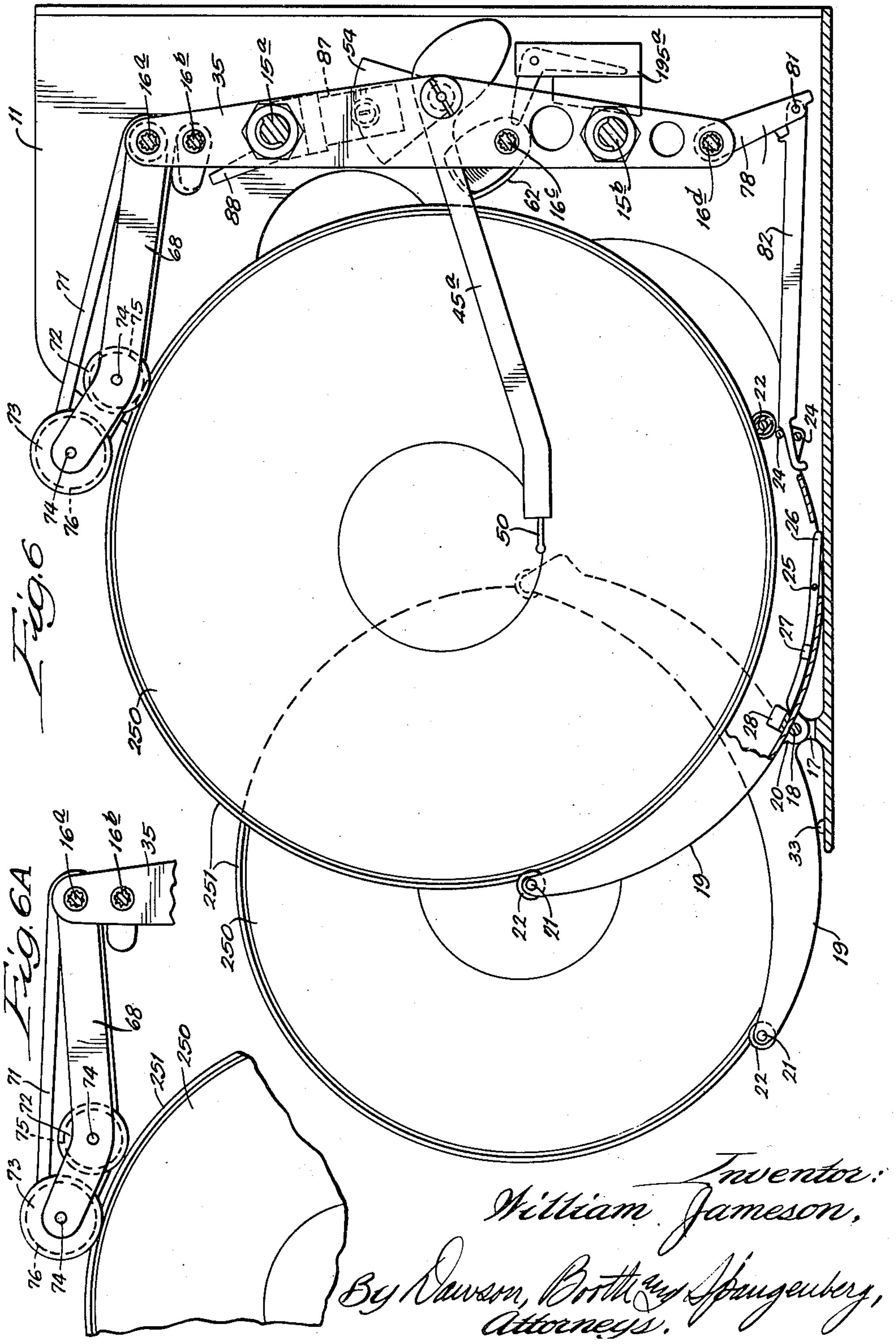
Figure 7:
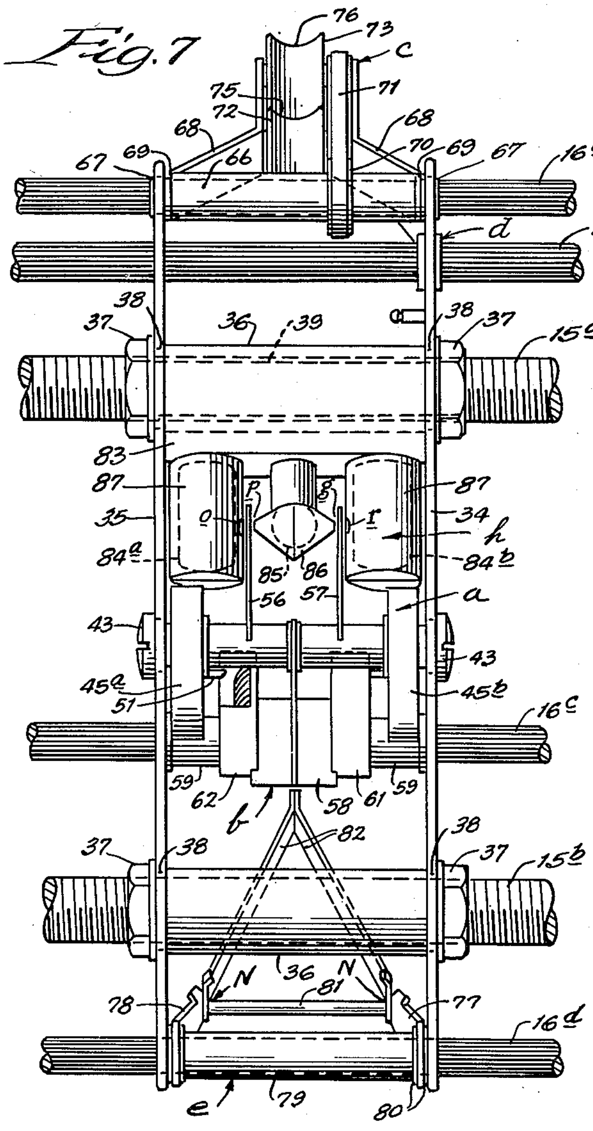
Figure 8:
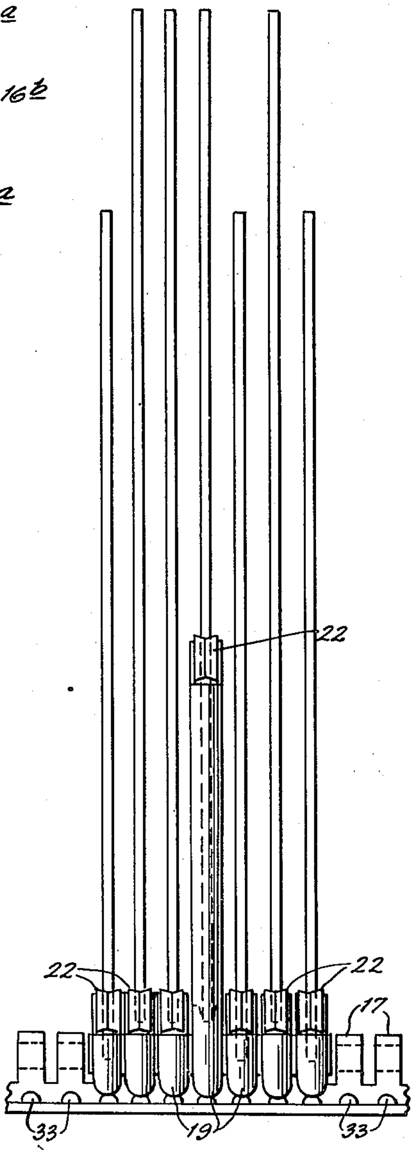
Figure 9:
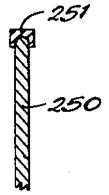
Figure 10:
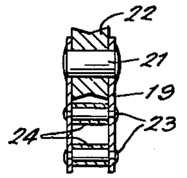
Figures 11, 12, 13, 15:
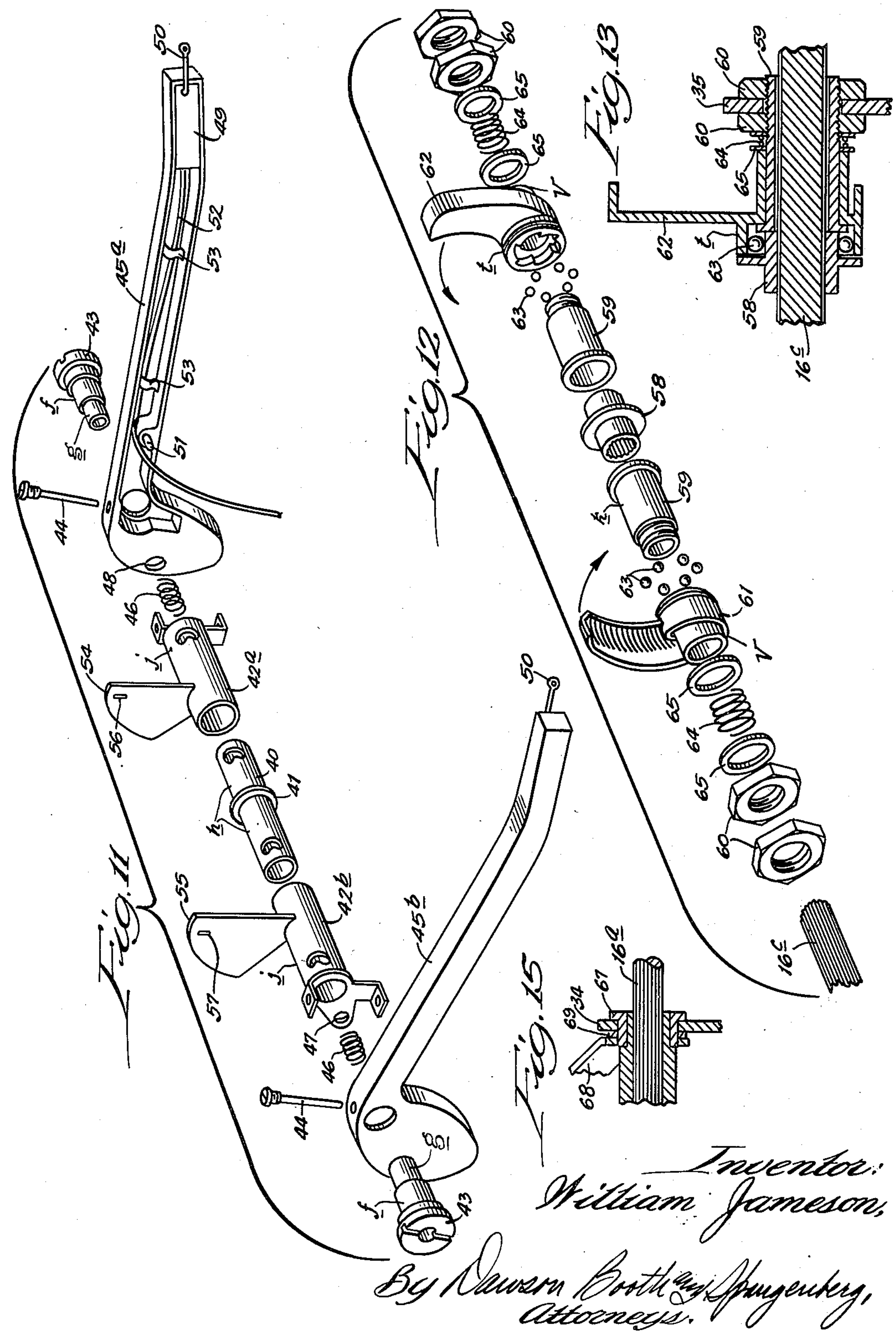
Figure 14:
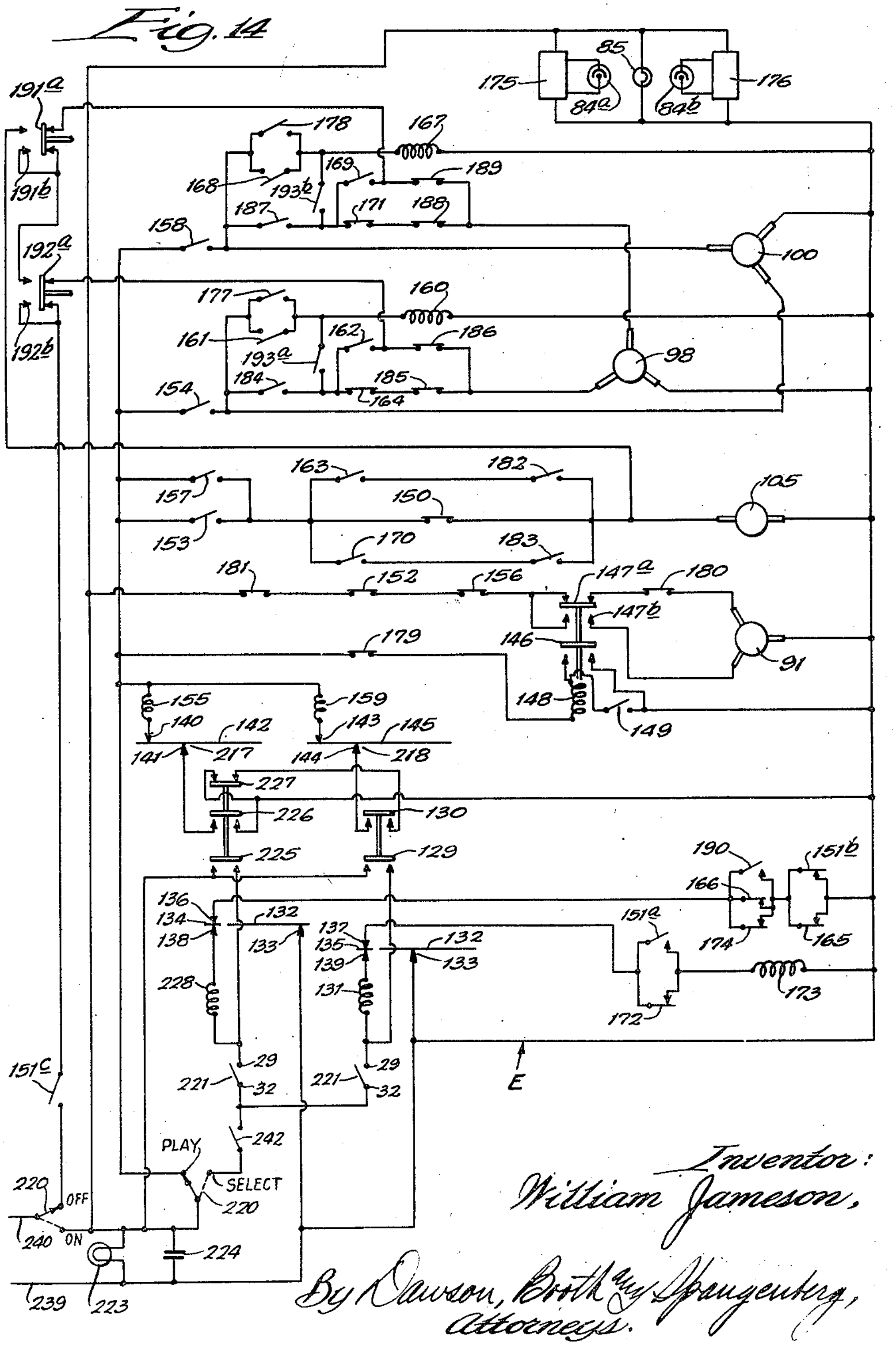
Figure 16:
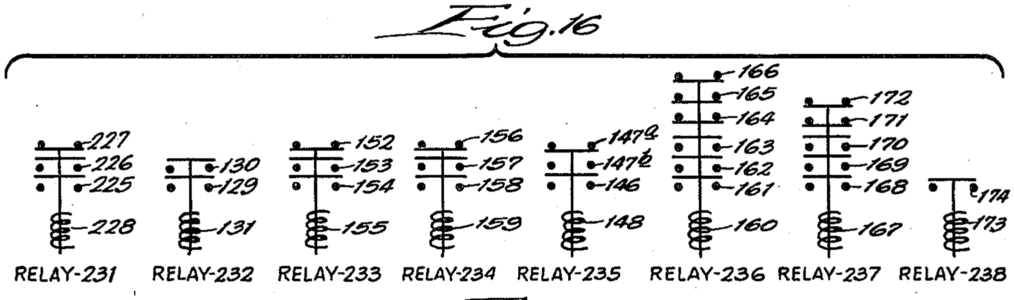
Figure 17:
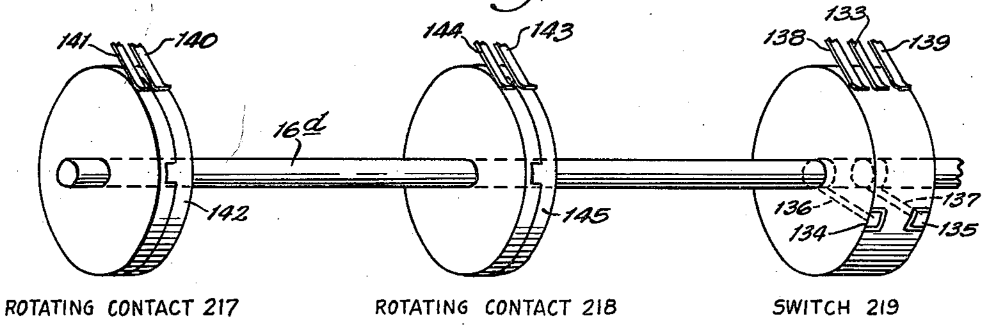
Figures 18, 19:
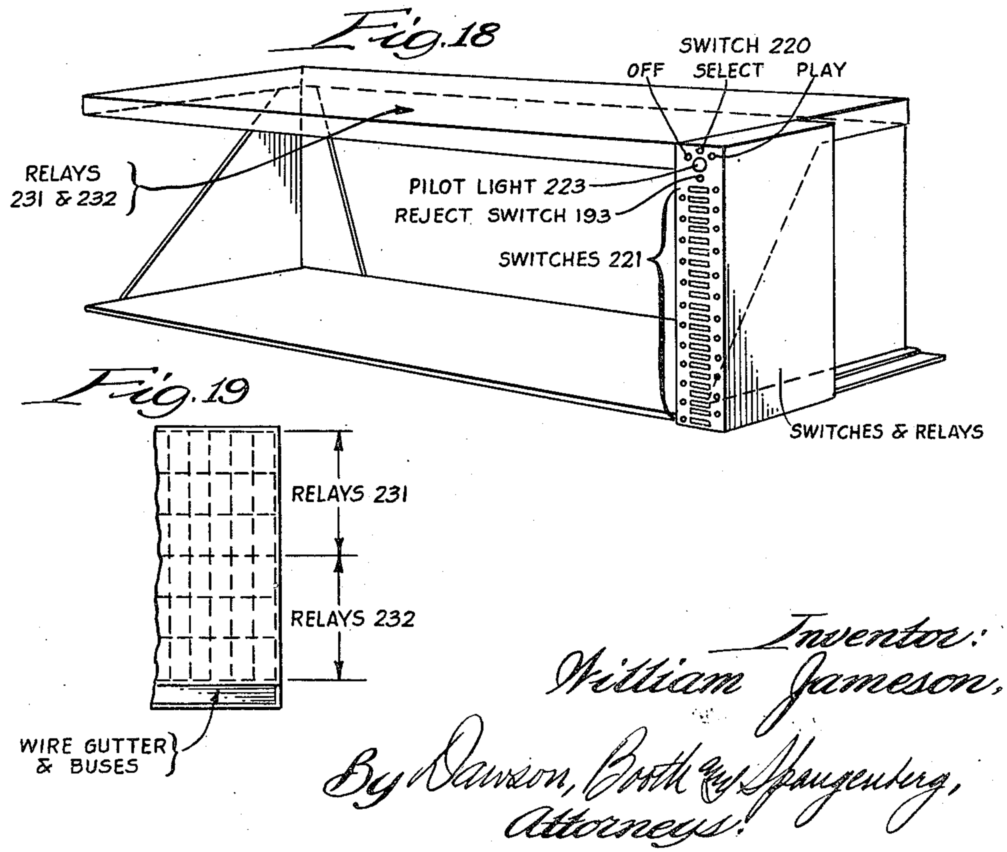

Figure 1 is a perspective view of apparatus embodying my invention; Fig. 2, a broken view similar to Fig. 1 but showing only the framework and shafts; Fig. 3, a broken end view in elevation; Fig. 4, a broken rear elevational view of the structure shown in Fig. 3; Fig. 5, a broken detail sectional view showing the record supported in a non-playing or storage position; Fig. 6, a view similar to Fig. 5 but showing the record in playing position; Fig. 6ª, a broken sectional view illustrating the driving mechanism employed for a small size record; Fig. 7, a broken rear elevation of the carriage device employed; Fig. 8, a front elevational view of the structure showing the support mechanism for the individual records; Fig. 9, a broken sectional view illustrating the record and edge ring; Fig. 10, a broken detail sectional view, the section being taken as indicated at line 10—10 of Fig. 5; Fig. 11, a perspective exploded view of the tone arm mechanism; Fig. 12, a similar exploded view of the tone arm actuating mechanism; Fig. 13, a broken sectional detail view, the section being taken as indicated at line 13—13 of Fig. 5; Fig. 14, a diagrammatic view of the wiring layout; Fig. 15, a detail sectional view of structure associated with the record drive shaft; Fig. 16, a diagrammatic layout of specific relays employed; Fig. 17, a broken perspective view of certain rotating contacts and a switch employed; Fig. 18, a broken perspective view of switch structure employed; and Fig. 19, a schematic plan view showing the arrangements.

The apparatus comprises broadly a frame A, a record storage mechanism B providing a plurality of individual cradles for records; a carrier C equipped with tone arms assembly *a*, tone arms control mechanism assembly *b*, record rotating means assembly *c*, record rotating means control cam *d*, cradle operating mechanism assembly *e*, tone arms limit assembly *h*; power mechanism D for operating said carrier and the driving means carried thereby; and electrical mechanism E for controlling the power mechanism.

In the frame structure A, 10 designates a base plate to which are assembled a left end plate 11 and a right end plate 12 to form a rigid structure. Bearing housings 13 are staked to or formed of end plates 11 and 12 into which are pressed suitable bearings 14. Supported in bearings 14 are threaded shafts 15 and keyed shafts $16^a$, $16^b$, $16^c$ and $16^d$. On base plate 10 are formed or attached thereto knuckles 17 which receive pivot pin 18.

In the storage mechanism B, 19 designates the record cradle which is mounted on base plate 10 by flanges 20 secured to knuckles 17 by pin 18. Mounted at each end of cradle on bearings 21 are rollers 22. At the inner end of the cradle 19, adjacent to roller 22, are rollers 24 mounted on bearings 23. Secured to cradle 19 on pin 25 is lever 26 to which is secured spring 27 and grooved block 28. Attached to spring 27 is contact 29. Spring 27 and contact 29 are separated by insulator 30. Mounted on cradle 19 and separated therefrom by insulator 31 is contact 32. Mounted on base plate 10 are stops 33.

Carrier assembly C consists of frames 34 and 35 secured to tubes 36 by nuts 37. Shoulders 38 and the bore 39 of tube 36 are threaded. The assembly 34—35—36 is a rigid structure. Threaded shafts 15 engage with threaded bores 39. Keyed shafts 16 pass through holes in 34 and 35.

Supported between frames 34 and 35 is tone arm assembly *a* consisting of two symmetrical assemblies about the center line of carrier C. Tube 40, on which is pressed washer 41, supports trunnions $42^a$ and $42^b$. Hollow bearing screws 43 secure to tapped holes in frames 34 and 35. The shoulders *f* and *g* of bearing screws 43 support alignment bearing tube 40 and trunnions $42^a$ and $42^b$. Attached to flanges of tone arms $45^a$ and $45^b$ are cam followers 51, conical tipped cylindrical pins. Tone arms $45^a$ and $45^b$ are free to rotate independently about the axis of alignment bearing tube 40 and about the axis of pivot screw 44. Ends of tone arms $45^a$ and $45^b$ are fitted with standard crystal pick-up 49 and stylus 50. Lead-ins 52 from pick-ups 49 are secured to tone arms $45^a$ and $45^b$ by clips 53. The force exerted by compression springs 46, retained between sockets at ends of brackets 47 of trunnions $42^a$ and $42^b$ and sockets 48 in counterweight of tone arms $42^a$ and $42^b$, direct the stylus ends of tone arms $45^a$ and $45^b$ pivoted about screws 44 toward the center line of carrier C. Mounted on trunnions $42^a$ and $42^b$ are shields 54 and 55 in each of which is aperture 56 and 57. Tone arms $45^a$ and $45^b$ are each statically balanced by adding or removing metal from counterbalances.

Tone arms control mechanism assembly *b* secures to frames 34 and 35 concentric with keyed shaft $16^c$ and is symmetrical about its center line, one-half of which is to control tone arm $45^a$ and the other half to control tone arm $45^b$ each independent of the other. The function of either unit is to control the movement of its tone arm $45^a$ or $45^b$ at all times except when the stylus 50 is on the record. A cycle of operation is 180° of rotation. Inner clutch race 58 is feathered to keyed shaft $16^c$. Bearing sleeves 59 are locked to frames 34 and 35 by nuts 60 and support cam and outer clutch races 61 and 62. Bearing sleeves 59 are free of keyed shaft $16^c$. Balls 63 are retained by the inner clutch race 58 and outer cam and clutch race 61. Springs 64, between washers 65, are mounted on bearing sleeves 59 so that hubs of cams and outer clutch races ride against shoulders of 59 at K with enough friction to prevent rotation except when actuated through balls 63. Cam and clutch 61 and 62 rotate in opposite directions and are of the over-riding type. Rotation of keyed shaft $16^c$ clockwise operates one clutch; rotation counter-clockwise operates the other; thus either tone arms may be controlled.

Record rotating means assembly *c* consists of a drive sheave 70, mounted sheaves 72 and 73, and an endless drive belt 71. Bushings 67 are pressed into frames 34 and 35 and support on shoulders *m* tube 66 and yoke 68 separated by washers 69. Sheave 70 mounted on tube 66 is concentric with and feathered to keyed shaft $16^a$. Yoke 68 is concentric with and free of keyed shaft $16^a$. Sheaves 72 and 73 are mounted on yoke 68 by shafts 74. Record drive wheels 75 and 76 are mounted on shafts 74. Sheaves 70, 72 and 73 are connected by endless drive belts 71 so that each rotates simultaneously, sheaves 72 and 73 rotating at the same speed. The diameters of drive wheels 75 and 76 are such as to rotate 10″ and 12″ records at the same speed.

Record rotating means control cam *d* is retained in place by and feathered to keyed shaft 16*b*.

Cradle-operating mechanism *e* consists of levers 77 and 78, separating tube 79, yoke 82, and shaft 81. Levers 77 and 78 are feathered to keyed shaft $16^d$ and separated by tube 79. Yoke 82 with hook formed at the end is connected to levers 77 and 78 by shaft 81 at *n*. Stops on levers 77 and 78 and yoke 82 limit travel about joint *n*.

Tone arm limit assembly *h* consists of base 83, selenium tubes $84^a$ and $84^b$, bulb 85, selenium tube shields 87, and bulb shield 86. Base 83 is bored to mount free of and concentrically with tube 36 of threaded shaft $15^a$. Base 83 has provisions for mounting two selenium tubes $84^a$ and $84^b$ and bulb 85. At one end of base 83 is lever 88, integral with base, and is held against stop 89 by spring 90. Selenium tube covers 87 and bulb shield 86 mount on base 83 so as to enclose selenium tubes $84^a$ and $84^b$ and bulb 85. Selenium tube covers 87 and bulb shield 86 are each provided with apertures at *o*, *p*, *q* and *r*.

Power mechanism D is an arrangement of electric motors 91, 98, 100, 105, gears, worms, worm wheels, shafts, cams, and levers for operating threaded shafts 15 and keyed shafts $16^a$, $16^b$, $16^c$, and $16^d$, all controlled by electric mechanism E, as described herein.

In the power mechanism D, 91 designates a motor. Power unit 91, mounted on end plate 12, drives threaded shafts 15 through gear train 92, 93 and 94, being arranged so that both shafts 15 rotate either clockwise or counter-clockwise simultaneously and at identical speeds. Power unit 91 is a reversible motor. Gear 92 is mounted on motor shaft. Gear 93, with inside and outside teeth, and shaft 95 on which it is pressed, are mounted in bearings 96 pressed in end plate 12 and bracket 97. Gears 94 are pressed on end shafts 15.

Power unit 98, mounted on end plate 12, is connected to and drives shaft $16^c$ through coupling 99. Power unit 98 is a reversible motor with integral gear reduction.

Power unit 100, mounted on end plate 12, drives keyed shaft $16^a$ through endless belt 104. Sheave 101 mounted on motor shaft and sheave 103 mounted on keyed shaft $16^a$ are connected by endless drive belt 104. Between sheave 103 and end plate 12, fly wheel 102 is mounted on keyed shaft $16^a$. Power unit 100 is a constant speed reversible motor.

Power unit 105, mounted on end plate 12, operates keyed shafts $16^b$ and $16^d$ through a system of worm wheels, worms, shafts, cams, and levers in which shafts 115 and 116 are arranged to operate at the same speed. Through worm 106, mounted on shaft of power unit 105, worm wheel 107, shaft 108, and worms 109 and 110 drive worm wheels 111 and 112. Worm wheels 111 and 112 and cams 113 and 114 are mounted on shafts 115 and 116. Shafts 115 and 116 are mounted in bearings 117 pressed in end plate 12 and bracket 97. Levers 118 and 119 are mounted on keyed shafts $16^b$ and $16^d$. Levers 120 and 121 are connected to levers 118 and 119 by pins 122, and cam followers 124, secured to ends of levers 120 and 121, are retained in cam grooves by shoes 123 on shafts 115 and 116.

The electrical mechanism E for controlling the power mechanism is a system of electrical circuits made up of bus and wire connected switches operated manually, electrically, and mechanically, supplemented by other parts as described below (of these parts relays 231 and 232 are assembled together in a shallow container and are fastened above end plates 11 and 12; and the balance of the parts, those not assembled with the power mechanism and carrier assembly, are assembled in a container which mounts on end plate 12 in the space in front of the power mechanism and which contains on its front face the switches 220 and 221 together with their indexes. The wiring from the carrier C consisting of lead-ins from the pick-ups, the connections to tone arm limit assembly *h*, and switches $195^a$ and $195^b$ are carried to an anchorage position at the center rear edge of base 10 as a trailaway with sufficient slack to permit the movement of the carrier C to either end of the mechanism). The operation of the electrical mechanism is categorically divided as follows:

*Manual*

*Switch 220.*—A 3-position 3-circuit switch with an "off," "select," and "play" position, in which "select" and "play" are common with the "on" position, and contact 149, is made momentarily in passing from "select" to "play." Pilot light 223 is combined with the switch.

*Switch 221.*—A plurality of normally open single pole push buttons, two for each cradle.

*Switch 193.*—A normally open double pole push button.

*Electrical*

*Relay 231.*—A plurality of relays, one for each cradle, consisting of coil 228 and contacts 225, 226 and 227.

*Relay 232.*—A plurality of relays, one for each cradle, consisting of coil 131 and contacts 129 and 130.

*Relay 233.*—Consisting of coil 155 and contacts 152, 153 and 154.

*Relay 234.*—Consisting of coil 159 and contacts 156, 157 and 158.

*Relay 235.*—Consisting of coil 148 and contacts 146 and 147.

*Relay 236.*—Consisting of coil 160 and contacts 161, 162, 163, 164, 165 and 166.

*Relay 237.*—Consisting of coil 167 and contacts 168, 169, 170, 171 and 172.

*Relay 238.*—Consisting of coil 173 and contact 174.

*Photronic relays 175 and 176.*—High speed and high sensitivity relays.

*Condenser 224.*—One mfd. capacitator.

*Mechanical*

*Rotating contact 217.*—A switch consisting of a ring 142 with projecting contact, a brush 140 in contact with ring, and a plurality of brushes 141, one for each cradle 19, arranged about the periphery of ring 142 and in the travel of contact of the ring.

*Rotating contact 218.*—A switch consisting of a ring 145 with a projecting contact, a brush 143 in contact with ring, and a plurality of brushes 144, one for each cradle 19, arranged about the periphery of ring 145 and in the travel of contact of the ring.

*Switch 219.*—Consists of collector ring 132 and two isolated segments 134 and 135, with connection to ring 132 made through brush contact 133, and connection to segment 134 made through brush contact 136, and connection to segment 135 made through brush contact 137.

Coil 228 of relay 231 is connected to line 239 through brush contact 138, ring 132, and segment 134. Coil 131 of relay 232 is connected to line 239 through brush contact 139, ring 132, and segment 135. Contact is made between relay 231 and relay 233 through brushes 140 and 141 on ring 142 of rotating contact 217, and between relay 232 and relay 234 through brushes 143 and 144 on ring 145 of rotating contact 218. Rotating contacts 217 and 218 and switch 219 are fixed and secured concentrically to tube 125, which is mounted on keyed shaft $16^d$, so that either may rotate independently of the other and is retained in place against shoulder *s* of shaft $16^d$ by spring washer 127. Gear 126 is mounted on tube 125 and engages with gear 128, which is mounted on threaded shaft $15^b$ so that as shaft $15^b$ rotates, rotating contacts 217 and 218 and switch 219 are also rotated in the ratio of approximately 350° of rotation for contacts and switch on tube 125 to the travel of carrier C between end plates 11 and 12 on shafts $15^a$ and $15^b$.

*Switch 179.*—A normally closed single pole switch secured to base 10 adjacent to end plate 11 so that contact with frame 34 travelling toward end plate 11 opens switch.

*Switch 180.*—A normally closed single pole switch secured to base 10 so that contact with frame 35 travelling towards end plate 12 or stationary adjacent to end plate 12 opens and holds open switch.

*Switch 241.*—A cam-operated arrangement of contacts in which 150, $151^a$, $151^b$, and $151^c$ are normally closed, and 184 and 187 are normally open. Switch 241 is fixed and secured concentrically to shaft 115 between power unit 100 and end plate 12 and is operated at 180° intervals by rotation of shaft 115.

*Switch $195^a$.*—A cam-operated arrangement of contacts in which 185, 186, 190 and $192^a$ are normally closed, and 182 and $192^b$ are normally open.

*Switch $195^b$.*—A cam-operated arrangement of contacts in which 183 and $191^b$ are normally open, and 188, 189 and $191^a$ are normally closed.

Switches $195^a$ and $195^b$ are identical, and are mounted together on carrier C supported from frames 34 and 35 so that the cam of switch $195^a$ follows groove *t* in cam and outer clutch race 62, and cam of switch $195^b$ follows groove *u* in cam and outer clutch race 61. Switches $195^a$ and $195^b$ operate one clockwise and the other counterclockwise at 180° intervals by rotation of shaft $16^c$.

*Switch 242.*—A lever-operated single pole switch in which contacts 29 and 32 are normally open.

*Operation*

*Loading.*—Records of varying diameter are placed intermixed in the storage magazine B one in each cradle 19. All cradles need not be filled, and only those containing records will function. A record, resting on rollers 22, engages and depresses grooved block 28 closing contacts 29 to 32 of switch 242 through which switches 221 are connected to line 240. Grooved block 28 also supports record in an upright position. The connection of all relays 231 and 232 to line 240 is through switches 242 and 221. Cradles 19 in which there are no records, and contacts 29 to 32 of switch 242 which have not been closed, are inoperative.

*Selection of records.*—Turn the indicator of switch 220 to pre-select the record sides to be played by momentarily closing switch 221 opposite each selection desired to be played. There is a switch 221 for each record side; two for each cradle 19. Each switch 221 is connected to a relay; odd numbers to relay 231 and even numbers to relay 232.

*Playing the record.*—The pre-selected records will play in numerical sequence. The cradles 19, each with a record having an odd and even numbered selection, are pivoted from storage magazine B to a playing position and returned at the end of the selection. Odd-numbered selections, and even-numbered selections consecutive with them, are the two sides of the same record, the second side of which, if selected, plays before being returned to the storage magazine B. With the return of the last selection to the storage magazine B, the device automatically returns to normal ready again for pre-selection of another group. Any selection may be rejected while playing, to be followed by the next selection in the sequence.

Carrier C, in the start position between end plate 12 and nearest end cradle 19, and to which it always returns automatically after playing the last selection, holds switch 180 open. After all selections have been made, turn indicator of switch 220 to play position. In passing from select to play positions, contact 149 is momentarily closed through which coil 148 of relay 235 is energized closing contact 146 and $147^b$ and opening contact $147^a$. Relay 235 holds closed through its contact 146. Power unit 91, energized through contact $147^b$, rotates threaded shafts $15^a$ and $15^b$ in the forward direction, and carrier C advances along cradles 19 of storage magazine B through engagement of threaded bores 39 of tubes 36 with threaded shafts 15. As the carrier C lines up with the first record selected, the brushes 141 and 144 make contact with the rings 142 and 145 connecting relay 231 to relay 233 if an odd selection has been made and relay 232 to relay 234 if an even numbered selection has been made.

Placing carrier C in a playing position centered on a cradle 19 is accomplished by energizing either relays 233 or 234 which de-energizes power unit 91 by opening circuit through either contact 152 or 156. Power unit 105 is energized by the closing of either contact 153 of relay 233 or 157 of relay 234. Rotation of power unit 105 is imparted to keyed shafts $16^b$ and $16^d$ through the arrangement of cams 113 and 114 and levers 118, 119, 120 and 121.

The hooked end of yoke 82 of cradle operating mechanism assembly *e*, feathered to keyed shaft $16^d$ and rotating counter-clockwise, engages roller 23 of cradle 19 causing storage mechanism B to rotate clockwise about pivot 20. As rotation progresses, the hook becomes engaged between rollers 23 and positively lowers mechanism B to base plate 10.

Simultaneous with the above operation, record rotating means assembly *c* is lowered by record rotating means control cam *d* which is feathered by keyed shaft $16^b$ so that as storage mechanism B approaches base 10, either of record drive wheels 75 or 76 engage the record, clasping it securely between rollers 22 and wheels 75 or 76 depending upon the record diameter.

With storage mechanism B securely in position on base 10, lever 26 is rotated counter-clockwise about pin 25 removing grooved block 28 from record, and record rotating means control cam *d* rotates free of record rotating means assembly *c*.

Cam-operated switch 241 on shaft 115 opens contact 150 and closes contacts 184 and 187 when storage mechanism B and rotating means assembly *c* reach the playing position. Opening of contact 150 de-energizes power unit 105 and shafts $16^b$ and $16^d$ come to rest. Energized relay 233 or 234 has closed contact 154 or 158 through which power unit 100 is energized causing record rotation in the correct direction through the linkage with keyed shaft $16^a$. Fly wheel 102, revolving on shaft $16^a$, tends to maintain uniform speed. Reversible power unit 98 is energized through either contact 154 of relay 233 or 158 of relay 234, causing keyed shaft $16^c$, to which power unit 98 is connected, to rotate in the correct direction.

Inner clutch race 58, feathered to keyed shaft $16^c$, rotates cam and outer clutch race 62 through clutch balls 63 when power unit is energized through relay 233 and rotates cam and outer clutch race 61 when power unit is energized through relay 234. Cam followers 51 on tone arms $45^a$ and $45^b$ are in cam grooves V when tone arms are in a feed-in position, the conical point of which rests on the bottoms of cam grooves V resisting the force of springs 46.

Approximately 175° of cam groove V is concentric with shaft $16^c$, the bottom of the groove V for this segment inclining or tapering towards the center of the assembly.

As either cam 61 or 62 revolves, follower 51, resting in and on bottom of cam groove V maintains the position of tone arm $45^a$ or $41^b$ about the axis of tube 40 as the concentric segment of the groove V is followed, and either tone arm $45^a$ or $45^b$ to pivot about screw 44 toward center so that stylus 50 is placed on starting groove of records. The various record sizes accommodated by this apparatus all have a common tone arm feed-in position which is the intersection of all the record starting grooves.

The cams 61 or 62 are rotated by shaft $16^c$ through a cycle of 180° at the end of which the cam followers 51 are free of the cam grooves V and the conical points of the followers 51 are off the bottoms of the grooves when the cams have rotated approximately 175° the stylus of either tone arm comes to rest in the record starting groove, and the inward pressure caused by springs 46 now is resisted by the stylus in the record groove.

At completion of 180° cycle by cams 61 or 62, switches $195^a$ or $195^b$ is actuated by their respective cams in grooves *t* and *u* in cams 61 and 62 opening contacts 185 to $192^b$ of switch $195^a$ and contacts 188 to $191^b$ of switch $195^b$, and closing contacts $192^b$ of switch $195^b$. Opening of either contact 185 or 188 de-energizes power unit 98 and stops rotation of shaft $16^c$ and either of cams 61 or 62.

The stylus in the record groove carries either tone arm $45^a$ or $45^b$ upward across record toward the record end groove.

Shields 54 and 55 rotate about axis of trunnions 42 or 43 between selenium tube shields 87 and bulb shield 86. With the stylus in the record end groove, the apertures 56 and 57 each coincide with apertures *p* and *q* in bulb shield 86, admitting light from bulb 85 through apertures *o* and *r* in selenium tube shields 87 to selenium tubes $84^a$ and $84^b$ which operate photronic relays 175 or 176 closing contact 177 or 178. This energizes either relay 236 or 237 which is held closed through its contact 161 or 168. Either contact 162 of relay 236 or contact 169 of relay 237 closes circuit to and energizes reversible power unit 98.

The cams 61 or 62 are rotated by shafts $16^c$ through a cycle of 186°. Through the first 6° or 7° of rotation, the conical point of either followers 51 engages the sloping grooved surface V of cams 61 or 62 and are forced outward against spring 46. Stylus 50 of tone arms $45^a$ or $45^b$ is raised from record and held stationary about axis of tube 40 by follower 51 point in grooves. As either cam 61 or 62 rotate, followers 51 are directed by outer flange of groove V, returning tone arms $45^a$ or $45^b$ to feed-in position.

At completion of 180° cycle by either cam 61 or 62, switches $195^a$ or $195^b$ are actuated by their respective cams in grooves *t* and *u* in cams 61 and 62 opening contacts 186, 190 and $192^a$ of switch $195^a$, and contacts 189 and $191^a$ of switch $195^b$, and closing contacts 182 and $192^b$ of switch $195^a$ and contacts 183 and $191^b$ of switch $195^b$. Opening of contacts 189 and 186 de-energizes power unit 98 stopping rotation.

If the foregoing selection is odd numbered and is consecutively followed by an even numbered selection, contact 190 of switch $195^a$ is open at the completion of cycle by cam 61 which has just returned the tone arm $45^b$ from the end of the odd numbered selection. Contact 166 of relay 236 is open.

There is current through the 232 relay energizing coil 173 and opening contact 174 of relay 238. Thus the circuit to the 231 relay is open and it returns to normal. Relay 236 is de-energized, its contacts returning to normal, preventing the energizing of power unit 105 and the return of cradle 19 to the storage magazine B. Contact 227 of relay 231 is closed, which closes circuit to relay 232 through its contact 130. Contact 163 of relay 236 and contact 170 of relay 237 are both open, preventing energizing of power unit 105 and the return of cradle 19 to storage magazine B. Power unit 98 is energized through closed contact 158 of relay 234 and contact 187 of switch 241 which cycles, placing tone arm 44 on record. At the end of the selection, photronic relay 176 closes contact 178 which holds through its contact 168, energizing power unit 105 which is described herein below.

Power unit 105 is energized through either contact 163 of relay 236 or contact 170 of relay 237, which is closed, and either contact 182 of switch $195^a$ or contact 183 of switch $195^b$ which is closed by completion of cycle by cams 61 or 62.

Rotation of power unit 105 is imparted to keyed shafts $16^b$ and $16^d$ through the arrangement of cams 113 and 114 and levers 118, 119, 120 and 121. The hook end of yoke 82 of cradle operating mechanism assembly *e*, feathered to keyed shaft $16^d$ and rotating clockwise, causes storage mechanism B to rotate counter-clockwise about pivot 20. Rotation of storage mechanism B lifts record rotating means assembly *c*, still in contact with record, clockwise about keyed shaft $16^a$, until lever 26 rotating clockwise about pin 25 is free of base 10. When grooved block 28 engages record and holds same upright as record rotating means control cam *d* rotates clockwise, engages record rotating means assembly *c*, disengaging it from record.

Cradle 19 of storage mechanism B comes to rest on base 10 against stop 33 as cradle operating mechanism assembly *e* is lifted free of rollers 23 and cradle 19.

Cam operated switch 241, on shaft 115, opens contacts 184, 187, $151^a$, $151^b$, $151^c$ and closes contacts 150 at completion of 180° cycle of shaft 115. Contact 172 on relay 237, or contact 165 on relay 236, and contacts $151^a$ and $151^b$ on switch 241 are open.

This opens the circuit through switch 219 to and de-energizes and returns to normal relay 231 or 232 which initiated the operation. Through opening of contact 226 of relay 231 or contact 130 of relay 232, relays 233 or 234 are de-energized, opening contacts 154 and 153 of relay 233, contacts 158 and 157 of relay 234, and closing contact 152 of relay 233 and contact 156 of relay 234. Closing contact 153 or 157 opens circuit to power unit 105 which is de-energized and stops.

Closing of contact 152 of relay 233 or contact 156 of relay 234 closes circuit to power unit 91 through contact $147^b$ of relay 235, which resumes rotation in a forward direction repeating the above sequence for each selection made.

Opening contact 154 or 158 opens circuit to relay 236 or 237 which are de-energized and returned to normal opening contacts 161, 162 and 163 of relay 236 or contacts 168, 169 and 170 of relay 237 and closing contacts 164, 165 and 166 of relay 236 or contacts 171 and 172 of relay 237.

After all selections have been played, the carrier C will continue to travel in a forward direction towards end plate 11 until at the end of its travel switch 179 is open, which opens the circuit to coil 148 of relay 235. Through the holding contact 146, relay 235 is de-energized. Contact $147^b$ opens the forward circuit and closes the return circuit through contact $147^a$, reversing the power unit 91 and direction of rotation of shafts $15^a$ and $15^b$. Carrier C is then returned to the starting position where frame 35 in contact with switch 180 opens and holds open circuit to power unit 91 which is de-energized and stops.

*Interruption to service.*—Should current failure occur while power units 98 or 105 are energized, it is necessary to complete their cycles upon resumption of service. Current failure opens relays 231 and 232 which cancel all preselections not played. When selector switch 220 is turned with indicator to "off" position, it connects line 240 to contact $151^c$ of switch 241 which is closed when power unit 105 is in cycle.

Through contact $151^c$ and contact $192^a$, power unit 98 is energized, which upon completion of its cycle opens its contact 192 and closes its contact $192^b$, energizing power unit 98 through contact $191^a$ reversing power unit 98 rotation. Thus tone arms $45^a$ and $45^b$ are returned to feed-in position through cams 61 and 62. Upon completion of the cycle, contact $191^a$ opens and contact $191^b$ closes, connecting line 240 to cycle motor 105. Completion of the cycle of power unit 105 opens contact $151^c$ of switch 241 and opens the circuit.

The apparatus has now had its components returned to normal and is ready for re-use, except carrier C which will return to starting position when indicator switch is turned to select position and while selections are being made.

*Record rejection.*—To reject a record selection while playing momentarily, close switch 193. This will energize the photorelay circuits 236 and 237, through which power unit 98 is energized and tone arm returned to "feed-in" position. The next selection will then play.

Any suitable record disk may be employed. In view of the fact that the disk is supported on edge and rotated by means engaging the edge, it is desirable to omit the central opening that normally appears in a record disk and to thus provide an imperforate disk. This not only increases the capacity of the record disk, but also provides highly useful space in the center for the use of a label, etc. In the illustration given in Fig. 9, the disk 250 is shown provided with a rubber tire 251. The resilient body thus provided serves not only as a protection for the disk but facilitates the rotation thereof in the mechanism shown. The tire spans chips or nicks in the peripheral edge of the disk and provides a smooth track for engagement with the drive wheels, etc. It will be understood that the tire 251 may be formed of any suitable material and may, if desired, be formed as an integral part of the disk 250.

While in the specific embodiments illustrated, the cradles for receiving the records are shown mounted for tilting movement upon a frame, it will be understood that they may be mounted for movement in other directions, as, for example, by sliding the cradles longitudinally along a central support so that in the playing of a selected record, the cradles or their records on their side of the selected record may be moved longitudinally to free a space about the record for the playing thereof in position.

In the foregoing description, I have set forth a specific embodiment of the invention in great detail for the purpose of illustrating one mode of use of the invention; it will be understood, however, that such details may be varied widely by those skilled in the art without departing from the spirit of my invention.

I claim:

1. In record storage and player apparatus, a frame, a threaded shaft rotatably mounted therein, means for rotating said shaft, a plurality of cradles each adapted to receive a disk thereon, said disks having record grooves and each having a resilient tire about its periphery, a carriage mounted upon said threaded shaft, a drive wheel mounted upon said carriage, means for rotating said drive wheel, said drive wheel being adapted to receive the tire of a selected disk for rotating the same when the disk is tilted forwardly, means for selectively tilting a cradle and the disk carried thereby forwardly to bring the tire rim thereof into engagement with said drive wheel, and a stylus carried by said carriage and adapted to be brought into engagement with a groove in said disk.

2. In record storage and player apparatus, a frame, a plurality of cradles each adapted to receive a disk thereon, said disks having record grooves and each having a resilient tire about its periphery, carriage means mounted on the frame, means to move said carriage means longitudinally on the frame, a drive wheel mounted upon said carriage means, means for rotating said drive wheel, said drive wheel being adapted to receive the tire of a selected disk for rotating the same when the disk is moved forwardly, means for selectively moving a cradle and the disk carried thereby forwardly to bring the tire rim thereof into engagement with said drive wheel, and a stylus carried by said carriage means and adapted to be brought into engagement with a groove in said disk.

3. In record storage and player apparatus having a plurality of cradles each adapted to receive a record disk thereon, a carriage adapted to move longitudinally along said cradles, a tone arm mounted upon said carriage, means for selectively moving a cradle and the disk carried thereby forwardly toward said carriage, means for positioning the carriage adjacent a selected cradle, means for rotating a selected record disk, means for engaging said tone arm with a selected record, and means for disengaging the tone arm from the selected record upon the record being played to completion, said disengaging means in combination with a tone arm limit assembly, comprising a light sensitive device, and means rendered operative by the movement of the tone arm to a final position in the playing of the record to energize said light sensitive device, whereby said disengaging means is energized and said tone arm is lifted from the record and returned to feed-in position.

4. In record storage and player apparatus having a plurality of cradles each adapted to receive a record disk thereon, a carriage adapted to move longitudinally along said cradles, a tone arm mounted upon said carriage, means for selectively moving a cradle and the disk carried thereby forwardly toward said carriage, means for positioning the carriage adjacent a selected cradle, means for rotating a selected record disk, means for engaging said tone arm with a selected record, and means for disengaging the tone arm from the selected record upon the record being played to completion, said disengaging means in combination with a tone arm limit assembly, comprising a light sensitive device, a light source spaced apart from said light sensitive device, a shield normally positioned between the light sensitive device and the light source and adapted to permit the light sensitive device to be energized when the tone arm is moved to final position in the playing of the record, a relay normally open and adapted to be closed when the light sensitive device is energized, whereby said disengaging means is energized and the tone arm is lifted from the record and returned to feed-in position.

5. In record storage and player apparatus having a plurality of cradles each adapted to receive a record disk thereon, a carriage adapted to move longitudinally along said cradles, tone arms mounted upon said carriage in spaced-apart relationship and adapted to receive a selected record therebetween, means for selectively moving a cradle and the disk carried thereby forwardly toward said carriage, means for positioning said carriage adjacent a selected cradle, means for rotating a selected record disk, means for engaging said tone arm with a selected record, and means for disengaging the tone arm from said selected record upon the record being played to completion, said disengaging means in combination with a tone arm limit assembly mounted upon the said carriage, and comprising two photo-electric cells in spaced-apart relationship, a bulb positioned centrally between said photo-electric cells, two shields each having an aperture therein and each positioned between said bulb and one of said photo-electric cells so that said photo-electric cells are normally deenergized, each of said shields cooperating with one of said tone arms, whereby the aperture in a shield is positioned to permit light from said light source to reach the photo-electric cell and thereby energize that photo-electric cell when the tone arm is moved to final position in the playing of the record, two photronic relays normally open and each cooperating with one of said photo-electric cells, each of said relays being adapted to be closed when a photo-electric cell with which it cooperates is energized, whereby the disengaging means is energized and the tone arms are lifted from the record and returned to feed-in position.

6. In record storage and player apparatus, a frame, a plurality of cradles supported upon said frame and adapted to receive records, each of said cradles having switch means mounted therein normally in open position and adapted to be closed when a record disk is received within the cradle, and a cradle preselection means for each of said cradles in combination with the switch means mounted in the cradle with which it is associated, said preselection means normally in an inoperative condition and adapted to be manually placed in operative condition when the switch means with which it is in combination is closed, whereby when a cradle has a record supported therein said switch means is closed and the cradle preselection means can be placed in operative condition with the result that a series of cradles can be preselected and the records carried thereby will be played in sequence automatically, and when a cradle does not have a record supported therein, the switch means is open and the preselection means for that cradle cannot be placed in operative condition thereby preventing the inclusion of an empty cradle in a preselected series.

WILLIAM JAMESON.

References Cited in the file of this patent

UNITED STATES PATENTS

| Number | Name | Date |
|---|---|---|
| 871,370 | Sherwood | Nov. 19, 1907 |
| 896,059 | Johnson | Aug. 11, 1908 |
| 1,213,468 | Emerson | Jan. 23, 1917 |
| 1,968,927 | Buckle | Aug. 7, 1934 |
| 2,003,424 | Brandstrom | June 4, 1935 |
| 2,113,401 | Goldsmith | April 5, 1938 |
| 2,175,142 | Andres | Oct. 3, 1939 |
| 2,182,739 | Schulz | Dec. 5, 1939 |
| 2,251,306 | Thompson | Aug. 5, 1941 |
| 2,281,547 | Andrews | May 5, 1942 |
| 2,283,797 | Dech | May 19, 1942 |
| 2,340,418 | Gabel | Feb. 1, 1944 |

FOREIGN PATENTS

| Number | Country | Date |
|---|---|---|
| 22,413 1900 | Great Britain | Nov. 9, 1901 |
| 335,768 | Great Britain | Oct. 2, 1930 |
| 598,584 | Germany | June 15, 1934 |